(12) United States Patent
Oyama et al.

(10) Patent No.: US 7,086,931 B2
(45) Date of Patent: Aug. 8, 2006

(54) MAGNETIC HEAD BAR HOLDING UNIT, LAPPING DEVICE, AND METHOD OF LAPPING MEDIUM-OPPOSING SURFACE OF THIN-FILM MAGNETIC HEAD

(75) Inventors: Nobuya Oyama, Tokyo (JP); Norikazu Ota, Tokyo (JP); Soji Koide, Tokyo (JP); Tetsuro Sasaki, Tokyo (JP); Osamu Fukuroi, Hong Kong (CN)

(73) Assignees: TDK Corporation, Tokyo (JP); SAE Magnetics (H.K.) Ltd., Shatin (CN)

( * ) Notice: Subject to any disclaimer, the term of this patent is extended or adjusted under 35 U.S.C. 154(b) by 261 days.

(21) Appl. No.: 10/822,833

(22) Filed: Apr. 13, 2004

(65) Prior Publication Data

US 2004/0259474 A1 Dec. 23, 2004

(30) Foreign Application Priority Data

Apr. 18, 2003 (JP) ............................ P2003-114713

(51) Int. Cl.
*B24B 49/00* (2006.01)
*B24B 51/00* (2006.01)
*B24B 1/00* (2006.01)
*G11B 5/127* (2006.01)
*B24B 7/00* (2006.01)

(52) U.S. Cl. ............................ 451/7; 451/53; 451/278; 29/603.7

(58) Field of Classification Search .................... 451/7, 451/41, 53, 278; 29/603.07, 60.308, 603.13
See application file for complete search history.

(56) References Cited

U.S. PATENT DOCUMENTS

| 6,414,818 B1 | 7/2002 | Tanimoto et al. |
| 6,945,847 B1 * | 9/2005 | Ota et al. ....................... 451/7 |
| 2004/0184192 A1 * | 9/2004 | Ota et al. ..................... 360/128 |
| 2004/0257706 A1 * | 12/2004 | Ota et al. ................. 360/234.5 |

FOREIGN PATENT DOCUMENTS

JP 2000-306215 11/2000

* cited by examiner

*Primary Examiner*—M. Rachuba
(74) *Attorney, Agent, or Firm*—Oliff & Berridge, PLC

(57) ABSTRACT

The heaters in the respective thin-film magnetic head in the bar are electrically connected to its neighbors, and a variable resistor is connected to each of the heaters in parallel. The resistance of each of the variable resistors is varied depending on the amount that the medium-opposing surface (ABS) of the thin-film magnetic head is to project. Also, the medium-opposing surface of the thin-film magnetic head in the magnetic head bar is polished while energizing all the heaters by the same power supply.

4 Claims, 16 Drawing Sheets

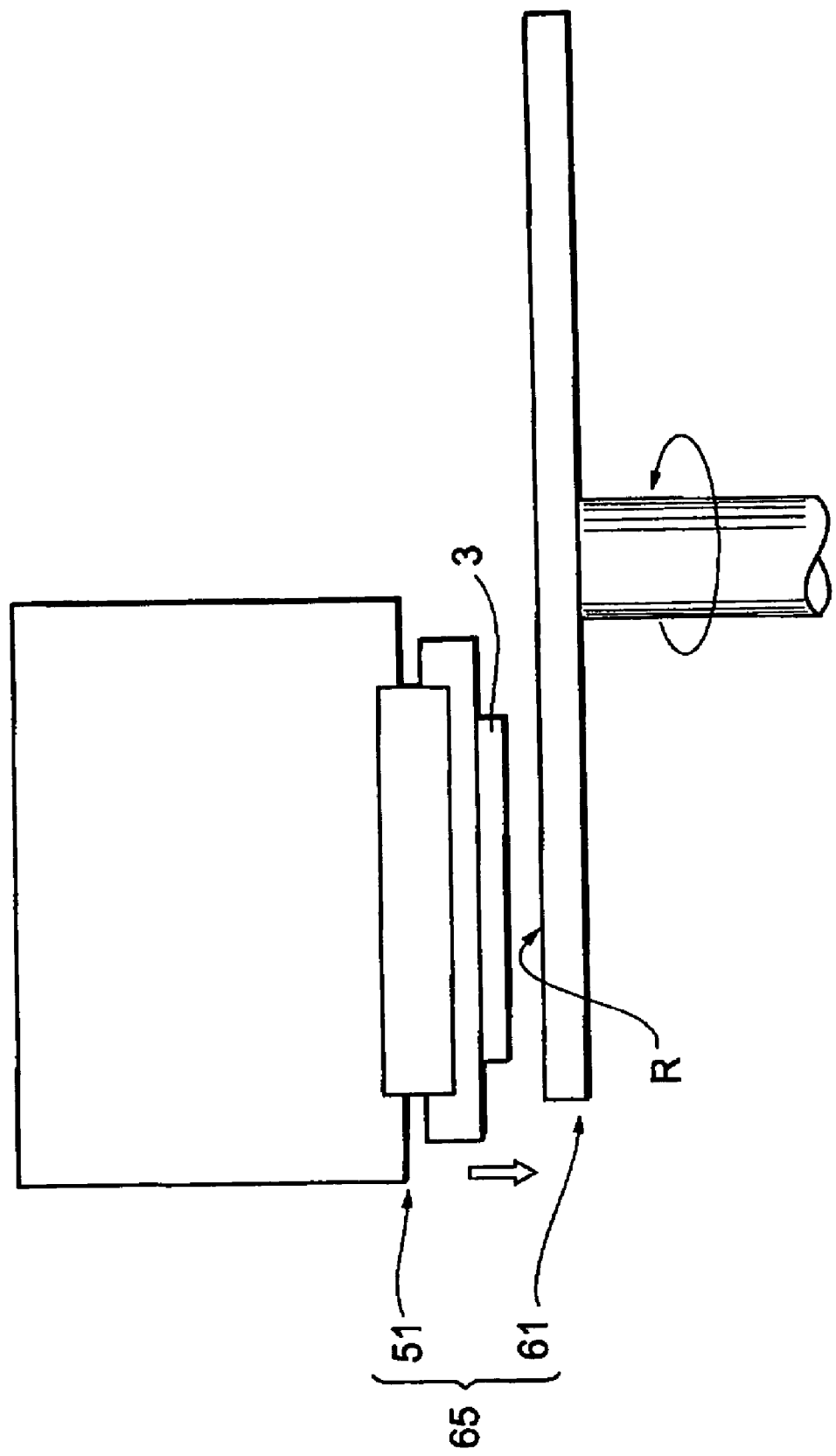

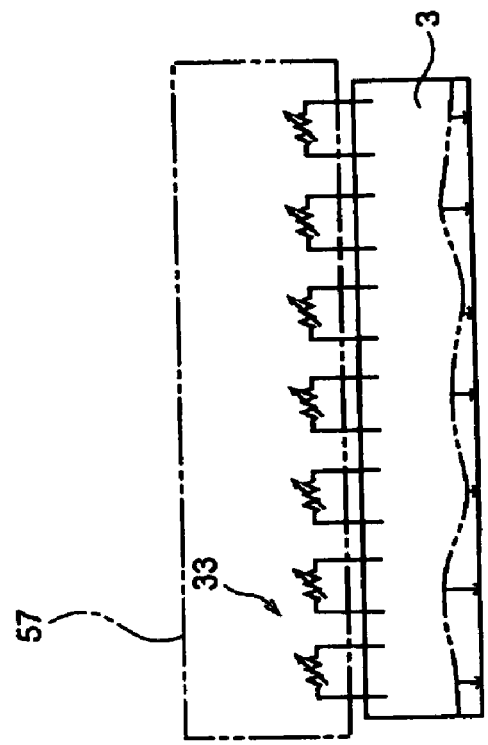
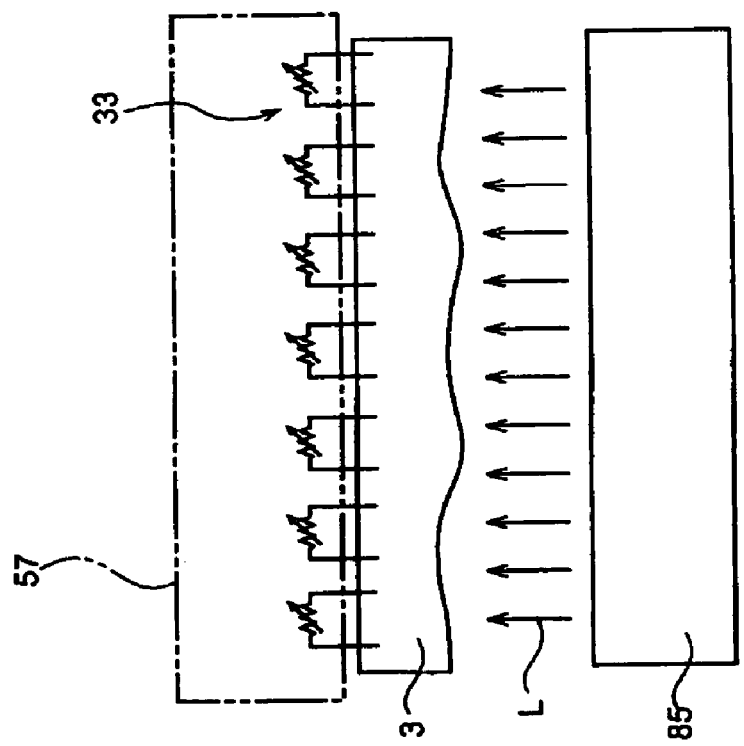
Fig. 12A
Fig. 12B

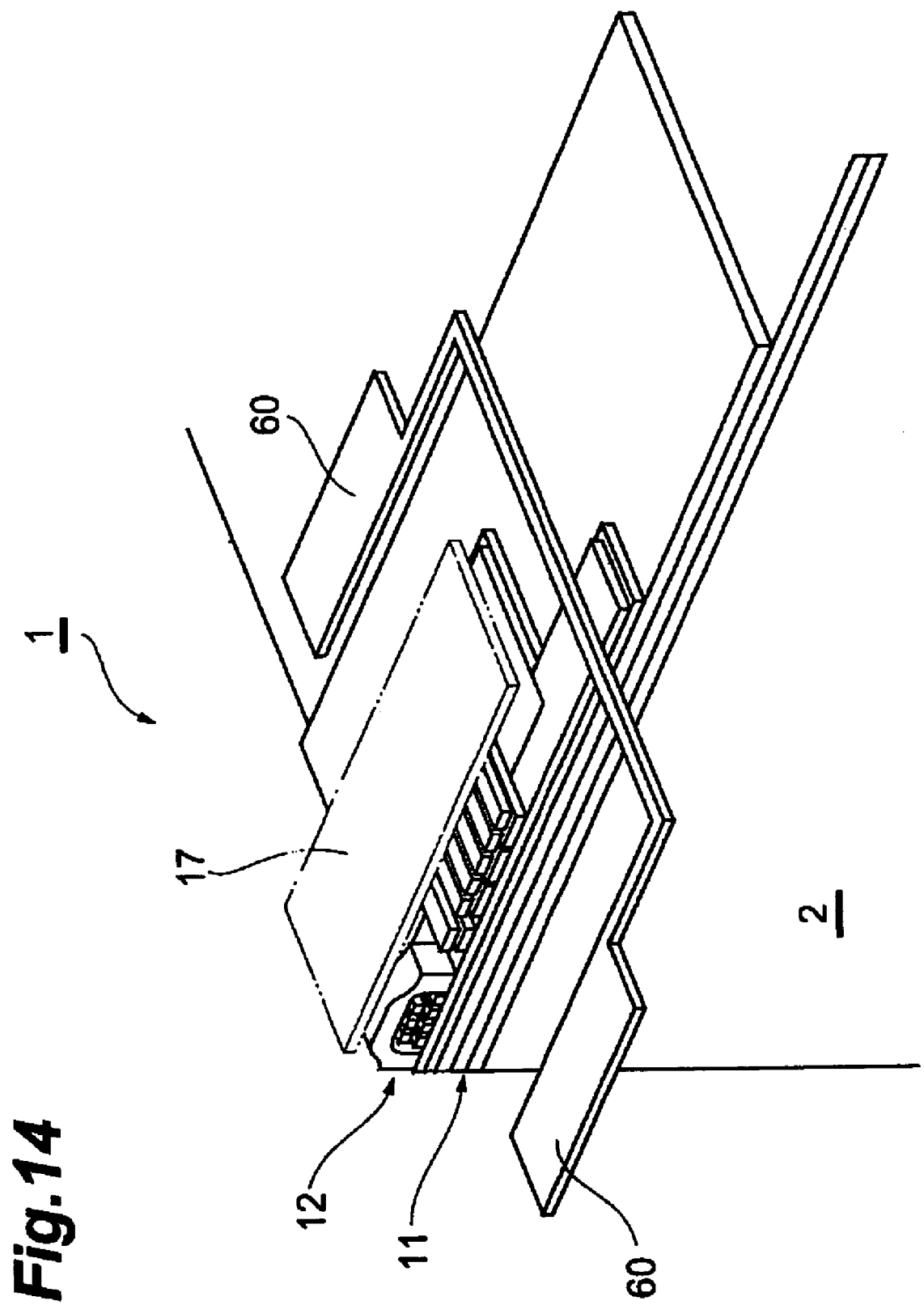

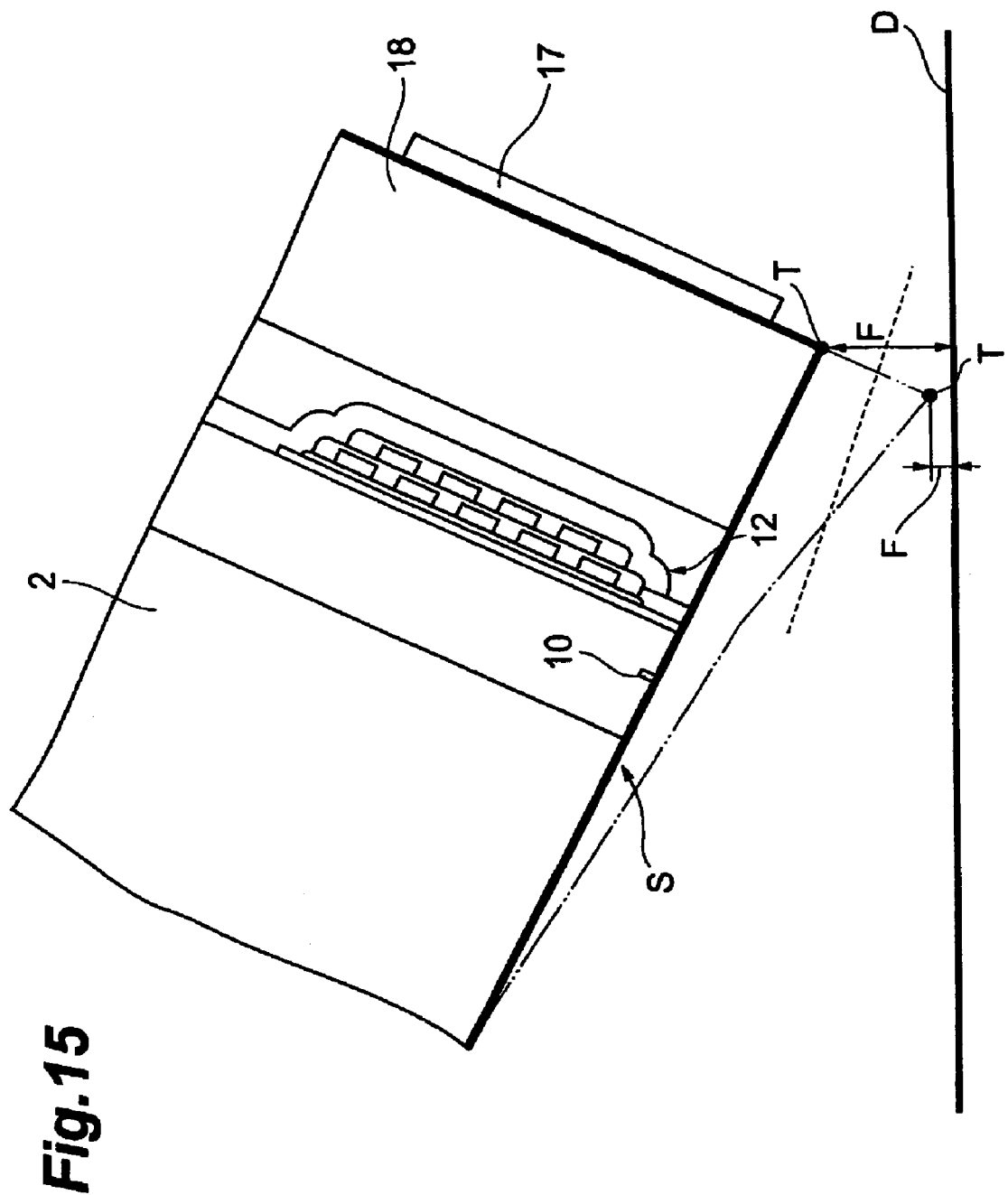

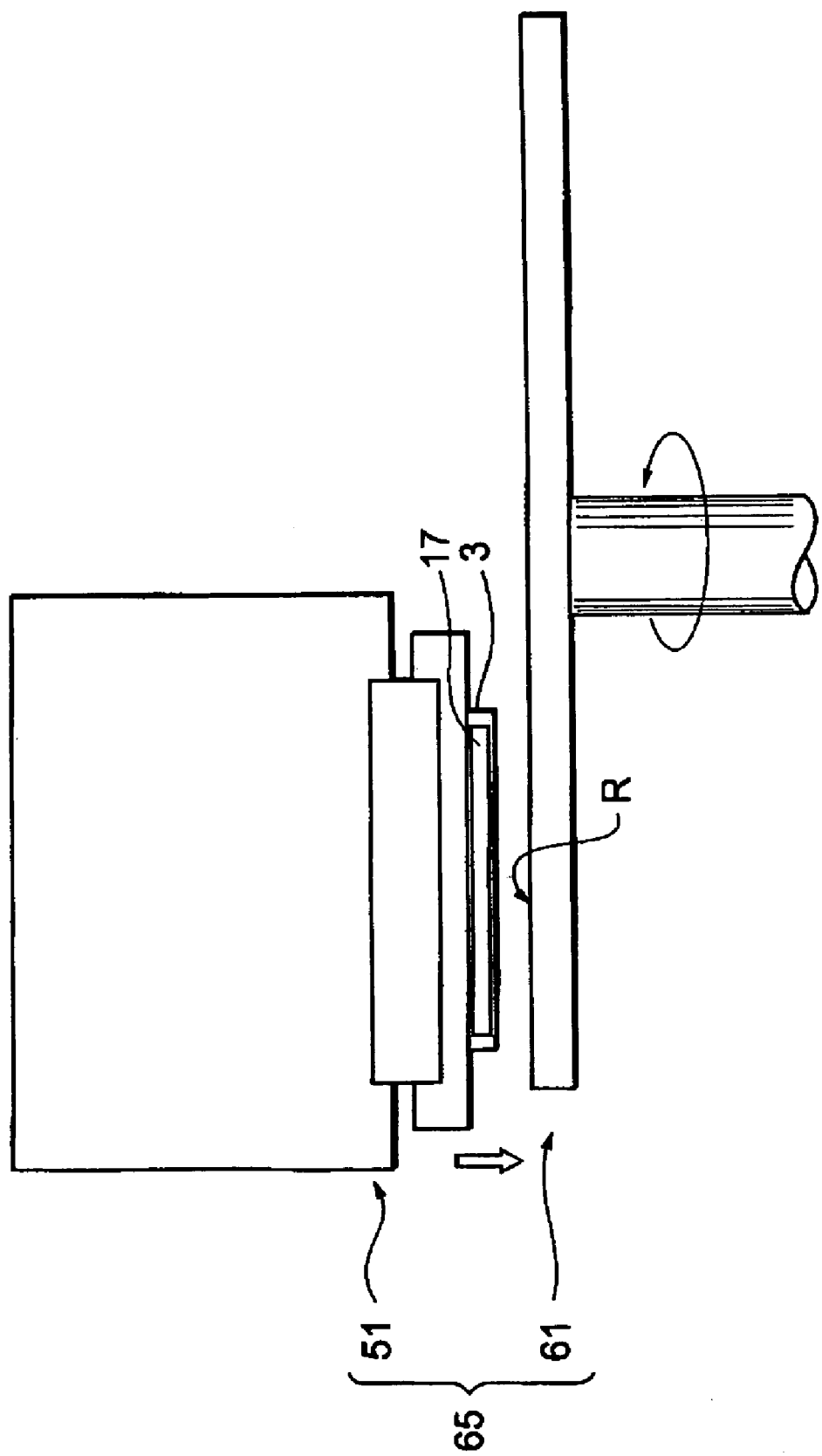

MAGNETIC HEAD BAR HOLDING UNIT, LAPPING DEVICE, AND METHOD OF LAPPING MEDIUM-OPPOSING SURFACE OF THIN-FILM MAGNETIC HEAD

BACKGROUND OF THE INVENTION

1. Field of the Invention

The present invention relates to a magnetic head bar holding unit, a lapping device, and a method of lapping medium-opposing surface (ABS) in a thin-film magnetic head.

2. Related Background Art

In general, a head gimbals assembly (HGA) is constructed by attaching a head slider formed with a thin-film magnetic head to a leading end of a flexible arm member such as a suspension. This head gimbals assembly is built in a hard disk drive (HDD) and carries out recording/reproducing to a hard disk that is a recording medium. At the time of recording/reproducing, an airflow that accompanies the rotation of the hard disk passes under the thin-film magnetic head, thereby levitating the magnetic head from the hard disk. As the recording density on the hard disk increased, the gap between the thin-film magnetic head and the hard disk, i.e., head flying height, has decreased to 10 nm, which currently seems to be the limit.

Under such circumstances, in a combination thin-film magnetic head in which a magnetoresistive device for reproducing and an inductive electromagnetic transducer for recording are laminated in this order on a support, a coil constituting the electromagnetic transducer will generate heat when the inductive electromagnetic transducer is energized. Then, the thin-film magnetic head will thermally expand in the vicinity of the electromagnetic transducer on a surface opposing a recording surface of the hard disk in the thin-film magnetic head, i.e., medium-opposing surface (ABS; Air Bearing Surface), thereby projecting toward the hard disk. As a consequence, the gap between the thin-film magnetic head and the hard disk may decrease, thereby causing the thin-film magnetic head and hard disk to come in contact with each other. Therefore, the flying height of the thin-film magnetic head must be kept such that the thin-film magnetic head and hard disk do not come in contact with each other even when the vicinity of the electromagnetic transducer thermally expands. Hence, fully achieving low levitation for a thin-film magnetic head has been difficult.

Known examples of techniques for achieving lower thin-film magnetic head levitation by preventing the occurrence of such a state include partly shaving the leading end part of the overcoat layer on the medium-opposing surface of the thin-film magnetic head to yield a step, and designing the coil constituting the electromagnetic transducer to have a glass transition temperature of about 70 to 100° C., thereby lowering Young's modulus, and reducing the thermal stress occurring in the coil part (see, for example, Japanese Patent Application Laid-Open No. 2000-306215).

SUMMARY OF THE INVENTION

However, the conventional techniques mentioned above, may not fully prevent the projection of the medium-opposing surface, and thus, further reduction in the levitation of the thin-film magnetic head in the future will be difficult.

The inventors have also been studying the forming a heater for adjusting the gap between a magnetoresistive device and a hard disk in the thin-film magnetic head (not publicly known), and the problem mentioned above may occur in this case as well.

It is an object of the present invention to provide a magnetic head bar holding unit, a lapping device, and a method of lapping a medium-opposing surface of a thin-film magnetic head that can prevent a thin-film magnetic head and a hard disk from contacting each other and thereby achieve lower levitation in the thin-film magnetic head.

In one aspect, the present invention provides a method of lapping a medium-opposing surface of a thin-film magnetic head, the method comprising the steps of: preparing a magnetic head bar in which thin-film magnetic heads are arranged in a row, each of the thin-film magnetic heads including a magnetoresistive device for reproducing, an inductive electromagnetic transducer for recording, a heater for generating heat when energized, the heaters in the respective thin-film magnetic heads being electrically connected to their neighbors in series; connecting a variable resistor to each of the heaters in parallel; varying resistance of each of the variable resistors depending on the amount that the medium-opposing surface of the thin-film magnetic head is to project; polishing the medium-opposing surface of the thin-film magnetic head in the magnetic head bar while energizing the heaters.

At the time of the actual recording onto a hard disk, the electromagnetic transducer of the thin-film magnetic head generates heat upon energization. As a consequence, layers surrounding the electromagnetic transducer expand, thereby the medium-opposing surface projects. In this aspect of the present invention, before the thin-film magnetic head is built into the hard disk drive, the heater provided with the thin-film magnetic head is caused to generate heat, so as to expand the medium-opposing surface in the vicinity of the heater, and the thus expanded part is polished.

Each of the heaters in the respective thin-film magnetic head in the magnetic bar are electrically connected to its neighbors in series and a variable resister is connected to each heater in parallel. In such a configuration, each heater is energized so as to generate heat. As a consequence, it becomes possible to vary the resistance of the variable resistor for each heater so as to adjust the amount of current that flows to each heater, respectively, thereby making it possible to adjust the amount of projection in the medium-opposing surface of each thin-film magnetic head. Also, not so much equipment is needed for energizing and lapping a plurality of medium-opposing surfaces of the thin-film magnetic heads at a time. Therefore, the medium-opposing surface can be lapped well and efficiently in each thin-film magnetic head. As a result, even if the medium-opposing surface expands when the electromagnetic transducer is energized at the time of the actual recording onto a hard disk, the flying height of the thin-film magnetic head can be set to an appropriate value and contact between the thin-film magnetic head and the hard disk can be prevented, thereby lowering levitation of the thin-film magnetic head.

In this case, the thin-film magnetic head may be formed on a support and the heater is disposed on a surface of the thin-film magnetic head opposite from the support, thus making it unnecessary to form the heater within the thin-film magnetic head, and thus facilitating the manufacturing of the thin-film magnetic head.

In another aspect, the present invention provides a magnetic head bar holding unit, comprising a bar holding portion for holding a magnetic head bar in which thin-film magnetic heads are arranged in a row, each of the thin-film magnetic heads including a heater for generating heat when energized; and variable resistors to be connected to each of the heaters in parallel.

In order to lap the medium-opposing surface of the thin-film magnetic head by using the magnetic head bar holding unit according to the present invention, firstly, a magnetic head bar is held by a bar holding portion. In the magnetic head bar, thin-film magnetic heads, each including a heater, are arranged in a row. Also, variable resistors are connected to each of the heaters in parallel. At this time, each of the heaters in the respective thin-film magnetic heads in the magnetic head bar is set to be electrically connected to its neighbors in series. Subsequently, resistance of each of the variable resistors is varied depending on the amount that the medium-opposing surface of each thin-film magnetic head is to project. In this state, the heaters in the magnetic head bar held by the bar holding portion are energized and the medium-opposing surface of the thin-film magnetic head is polished by a polishing machine and so on.

As a consequence, it becomes possible to vary the resistance of the variable resistor for each heater so as to adjust the amount of current that flows to each heater, respectively, thereby making it possible to adjust the amount of projection in the medium-opposing surface of each thin-film magnetic head. Also, not so much equipment is needed for energizing and lapping a plurality of medium-opposing surfaces of the thin-film magnetic heads at a time. Therefore, the medium-opposing surface can be lapped well and efficiently in each thin-film magnetic head. As a result, even if the medium-opposing surface expands by energizing the electromagnetic transducer at the time of the actual recording onto a hard disk, the flying height of the thin-film magnetic head can be set to an appropriate value. This can prevent the thin-film magnetic head and the hard disk from coming in contact with each other, thereby realizing lower levitation in the thin-film magnetic head.

In another aspect, the present invention provides a lapping device, comprising a magnetic head bar holding unit having a bar holding portion for holding a magnetic head bar in which thin-film magnetic heads are arranged in a row, each of the thin-film magnetic heads including a heater for generating heat when energized, and variable resistors to be connected to each of the heaters in parallel, a polishing unit for polishing a medium-opposing surface of the magnetic head bar held by the bar holding unit.

Thus configured the lapping device polishes the medium-opposing surface of the thin-film magnetic head in the magnetic head bar, while holding the magnetic head bar by the magnetic head bar holding unit mentioned above. Therefore, the medium-opposing surface can be lapped well and efficiently in each thin-film magnetic head. As a result, the thin-film magnetic head and the hard disk can be prevented from coming in contact with each other, thereby realizing lower levitation in the thin-film magnetic head.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 10 is a view showing a lapping device of the embodiment according to the present invention;

FIG. 12A is a view showing a state in which the medium-opposing surface of a bar is observed;

FIG. 12B is a view showing a state in which the heaters are energized while varying resistance of variable resistors, based on the result of the observation in FIG. 12A;

FIG. 14 is a schematic sectional view showing an example of the thin-film magnetic head in which the heaters are arranged in a divided fashion;

FIG. 15 is a view showing an another example of heater position in the thin-film magnetic head;

FIG. 16 is a view showing the bar shown in FIG. 15 being applied to the lapping device of the embodiment according to the present invention.

DESCRIPTION OF THE PREFERRED EMBODIMENTS

Figure 1A:
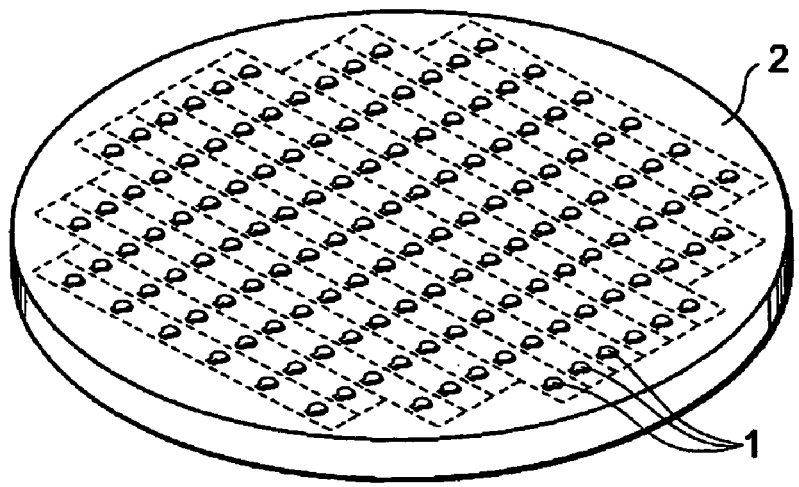
FIG. 1A is a view showing a plurality of thin-film magnetic heads to which the lapping method of an embodiment according to the present invention is to be applied formed on a support.

In the following, preferred embodiments of the present invention will be explained in detail with reference to the accompanying drawings. In the figures, like reference numerals identify like elements.

Figure 1B:
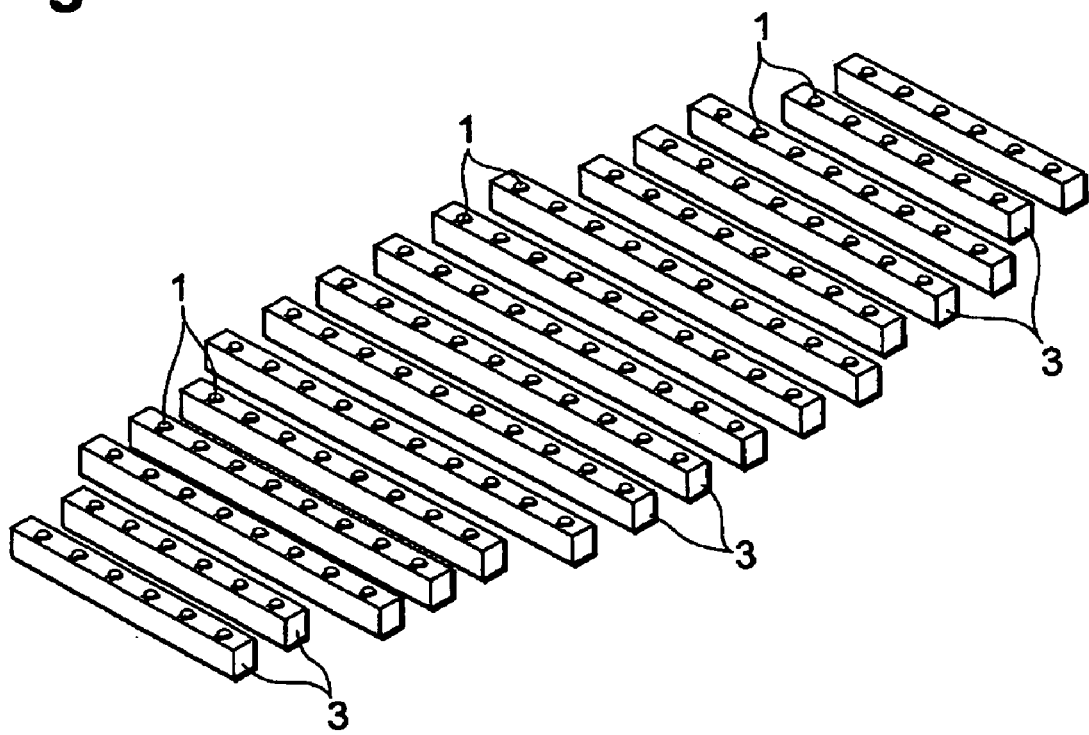
FIG. 1B is a view showing the production of a plurality of bars each including thin-film magnetic heads arranged in a row by cutting the support.

FIG. 1A shows thin-film magnetic heads 1 to which the lapping method in accordance with an embodiment according to the present invention is applied formed on a support 2 made of AlTiC ($Al_2O_3$.TiC) or the like. FIG. 1B shows the production of a plurality of magnetic head bars 3 (hereinafter, referred to as 'bar') each including thin-film magnetic heads 1 arranged in a row by cutting support 2.

Figure 2:
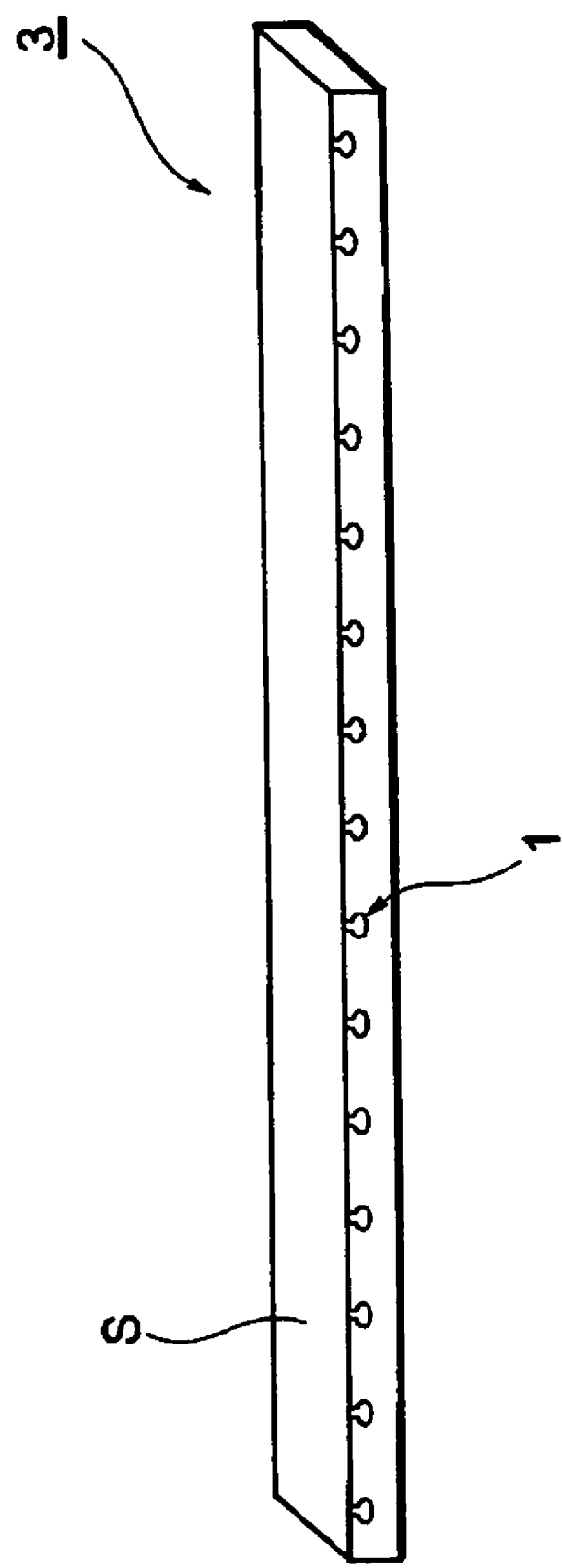
FIG. 2 is a view showing a bar after MR height adjustment.

Polishing in the lapping method in accordance with this embodiment refers to one applied to a medium-opposing surface of a thin-film magnetic head of bar 3 in the stage shown in FIG. 1B before, after, or in the middle of lapping for adjusting the MR height or the like. The MR height refers to the distance in the depth direction of the magnetoresistive device for reproducing as seen from the medium-opposing surface. The medium-opposing surface is a surface opposing a recording surface of a hard disk, and is known as the air bearing surface (ABS) generally. FIG. 2 shows a bar 3 after MR height adjustment.

The configuration of each thin-film magnetic head 1 to which the lapping method in accordance with this embodiment is applied will now be explained.

Figure 3:
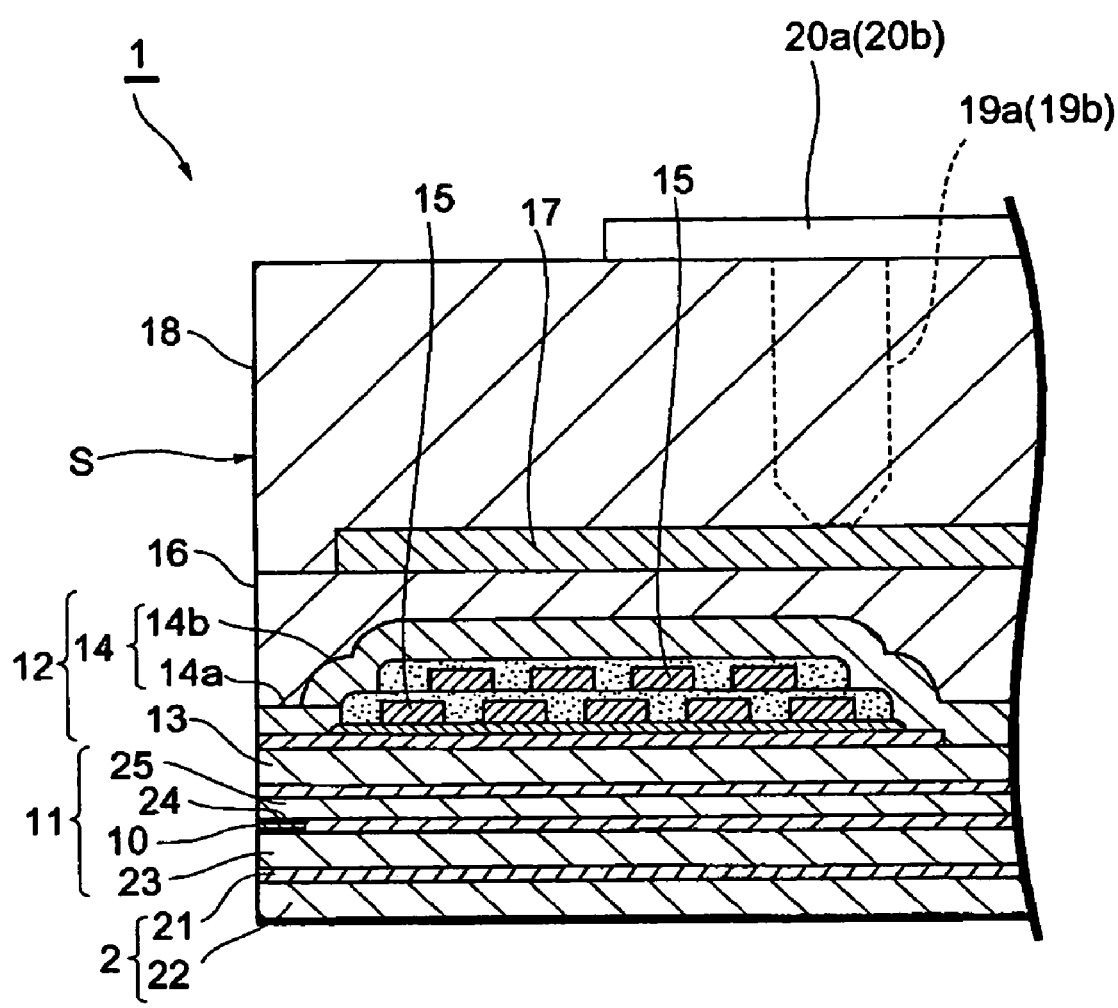
FIG. 3 is a schematic sectional view taken in a direction perpendicular to the medium-opposing surface of the thin-film magnetic head of the bar shown in FIG. 2.

FIG. 3 is a schematic sectional view of bar 3 (shown in FIG. 2) taken in a direction perpendicular to medium-opposing surface S of thin-film magnetic head 1. In FIG. 3, thin-film magnetic head 1 is a combination thin-film magnetic head in which a reproducing head part 11 having a GMR (Giant MagnetoResistive) device 10 for reproducing and a recording head part 12 acting as an inductive electromagnetic transducer for writing are laminated on support 2. The GMR device utilizes a giant magnetoresistive effect yielding a high magnetoresistance change ratio. Alternatively, AMR (Anisotropic MagnetoResistive) devices utilizing anisotropic magnetoresistive effects, TMR (Tunneling MagnetoResistive) devices utilizing magnetoresistive effects occurring at tunnel junctions, CPP-GMR devices, and the like may be used instead of the GMR device.

Support 2 comprises a substrate 22 made of AlTiC ($Al_2O_3.TiC$) or the like and an undercoat layer 21 made of an insulating material such as alumina ($Al_2O_3$) formed thereon.

Lower shield layer 23 is formed on undercoat layer 21, and the above-mentioned GMR device 10 is formed above lower shield layer 23. GMR device 10, which is constituted by a plurality of films in practice, is depicted as a single layer.

GMR device 10 is surrounded by an insulating layer 24 made of $Al_2O_3$ or the like. Upper shield layer 25 is formed on insulating layer 24.

Recording head part 12 is for longitudinal recording, and mainly comprises a lower magnetic pole 13, an upper magnetic pole 14 magnetically coupled to lower magnetic pole 13, and a thin-film coil 15 that is partly positioned between lower magnetic pole 13 and upper magnetic pole 14.

Upper magnetic pole 14 is constituted by a magnetic pole part layer 14a located on medium-opposing surface S side, and a yoke part layer 14b connected to magnetic pole part layer 14a while bypassing thin-film coil 15 thereunder. Magnetic pole part layer 14a and yoke part layer 14b may be formed integrally.

An overcoat layer 16 is formed on upper magnetic pole 14. Formed on overcoat layer 16 is a heater 17 made of Cu, NiFe, Ta, Ti, CoNiFe alloy, FeAlSi alloy, or the like. Heater 17 generates heat upon energization, so as to thermally expand layers thereabout, thus adjusting the gap between GMR device 10 and the hard disk. An overcoat layer 18 is further formed on heater 17.

Two conductive parts 19a, 19b made of an electrically conductive material such as Cu, each extending upward in the drawing, are electrically connected to heater 17. Heater electrode pads 20a, 20b are attached to conductive parts 19a, 19b at their upper ends (on the surface of overcoat layer 18), respectively (shown in FIG. 7).

Similarly, two conductive parts (not depicted) made of an electrically conductive material are electrically connected to each of reproducing head part 11 and recording head part 12, so as to connect with their corresponding reproducing and recording electrode pads at the upper ends of the conductive parts. The reproducing and recording electrode pads will be explained later.

Figure 4:
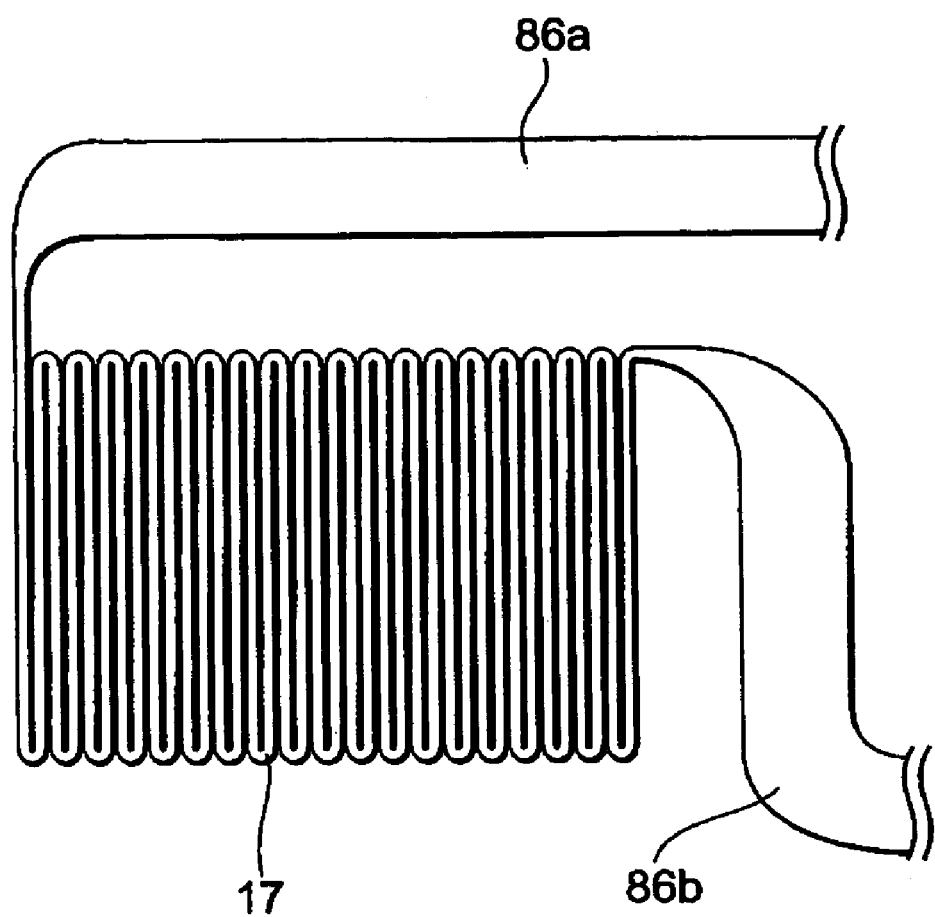
FIG. 4 is a plan view showing an example of a heater.

FIG. 4 is a view showing an example of heater 17. Heater 17 has a meandering shape (serpentine shape), the two ends of which are connected with extraction electrodes 86a, 86b, respectively. Extraction electrode 86a, 86b are connected with conductive parts 19a, 19b shown in FIG. 3, respectively.

Figure 5:
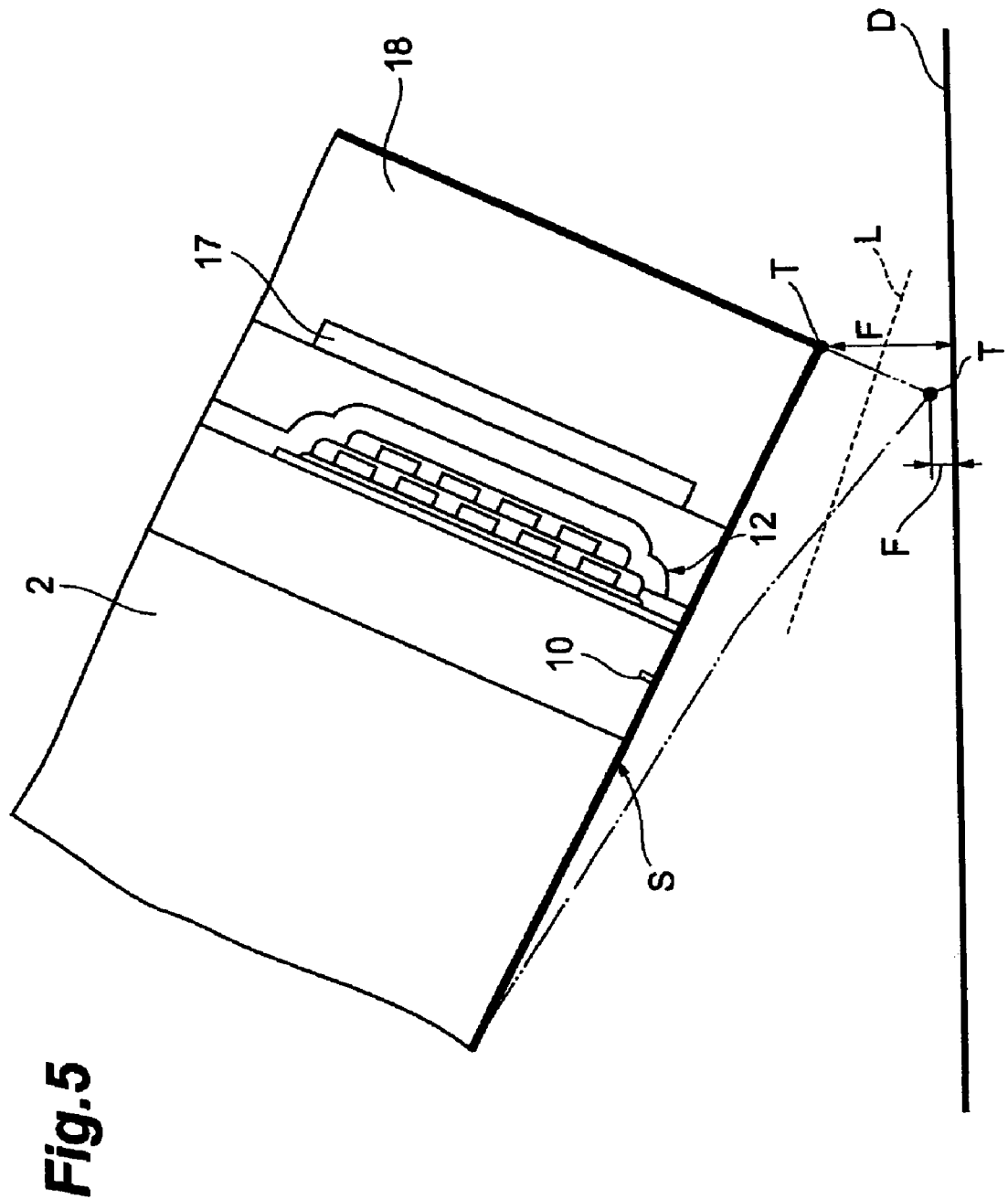
FIG. 5 is a view showing a relationship between the medium-opposing surface and the recording surface of the hard disk.

FIG. 5 is a view showing the relationship between medium-opposing surface S of thin-film magnetic head 1 and recording surface D of the hard disk.

When heater 17 of thin-film magnetic head 1 is energized, medium-opposing surface S thermally expands in the vicinity of the heater 17, thereby projecting toward recording surface D of the hard disk (as indicated by the dash-double-dot line in the drawing). Here, overcoat layer 18 in the vicinity of a corner T on the surface opposite from support 2 tends to project the farthest, thereby reducing gap F between medium-opposing surface S and recording surface D of the hard disk. Consequently, there is a possibility of corner T coming into contact with recording surface D of the hard disk.

Therefore, in the lapping method of this embodiment, overcoat layer 18 is polished from corner T to the region indicated by a broken line L in FIG. 5 when the medium-opposing surface S has been expanded in the vicinity of the heater 17, i.e., when heater 17 is energized, before thin-film magnetic head 1 is built into the hard disk drive.

The following will explain the lapping method of this embodiment more specifically.

Figure 6:
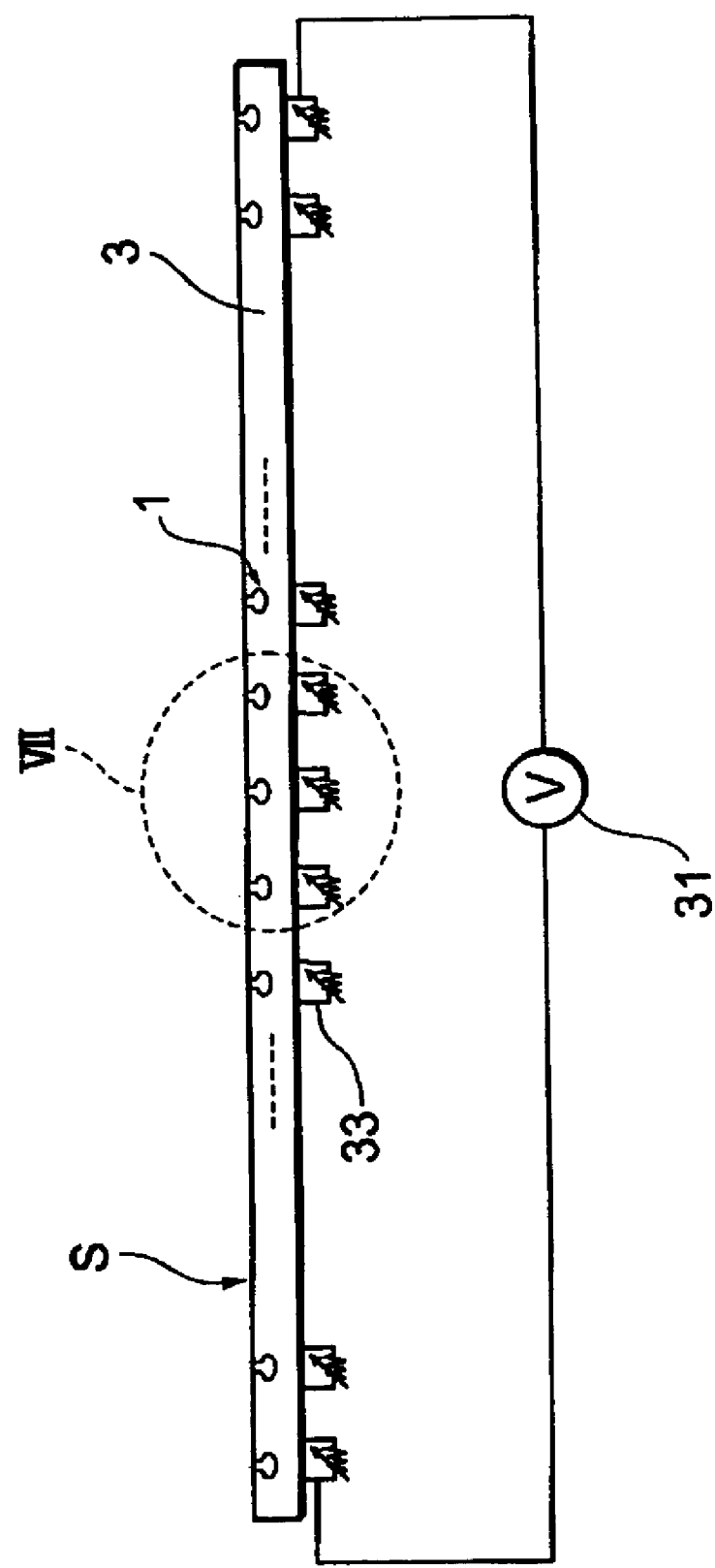
FIG. 6 is a schematic view showing a state in which an external power supply is connected to the bar shown in FIG. 2.
Figure 7:
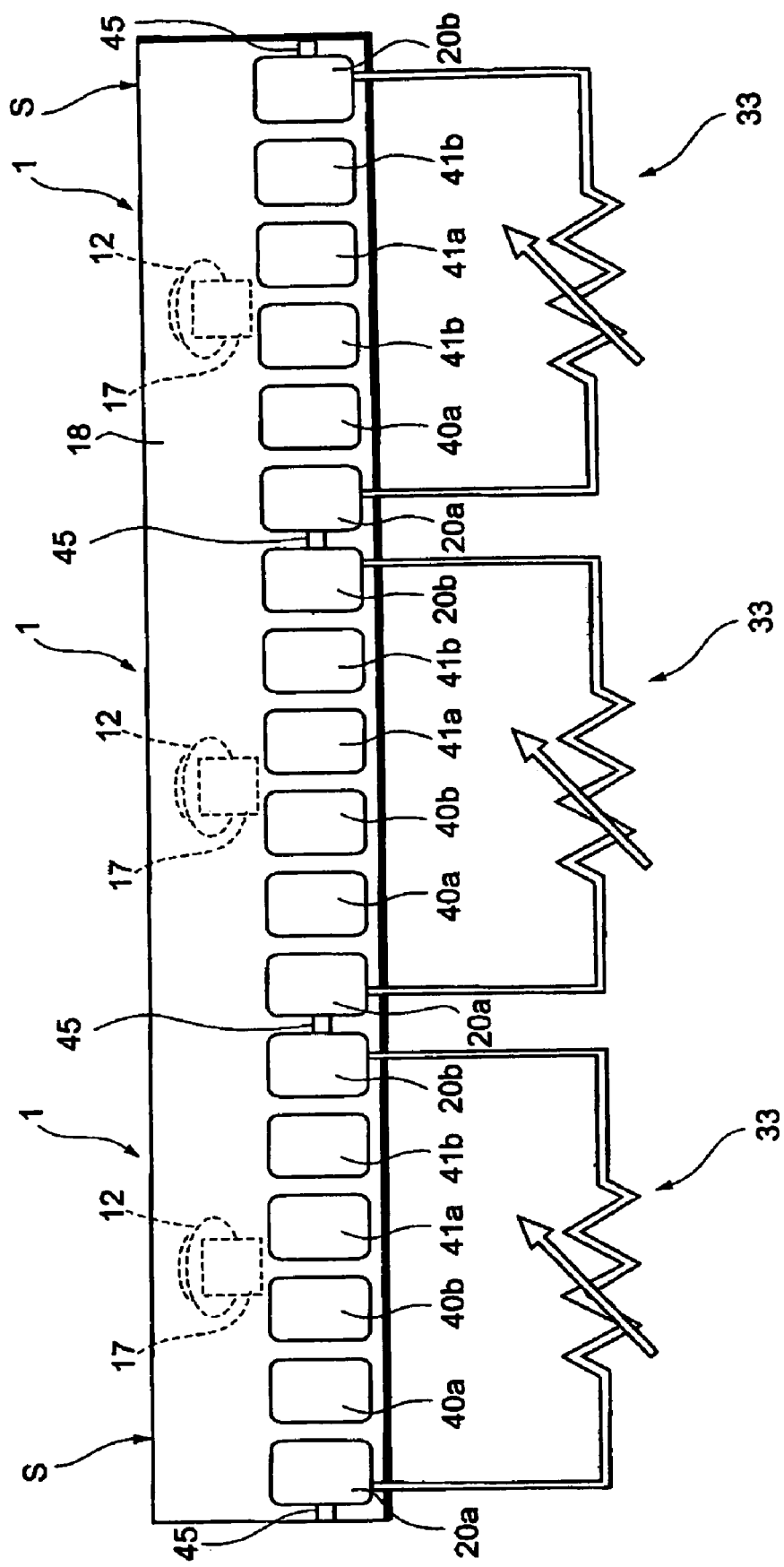
FIG. 7 is a partly enlarged view of a region VII in the bar shown in FIG. 6.

FIG. 6 is a schematic view of a situation that an external power supply 31 is connected to bar 3 previously shown in FIG. 2, and FIG. 7 shows an enlarged view of a region VII in bar 3 shown in FIG. 6. In this embodiment, each of the heaters 17 in a plurality of thin-film magnetic heads 1 in bar 3 is electrically connected to their neighbors in series (the connection method will be explained later), and variable resistors 33 are connected to heaters 17 in parallel such that there is one variable resistor 33 for each heater 17. Turning on external power supply 31 energizes variable resistors 33 and heater 17 in each thin-film magnetic head 1 in bar 3.

As shown in FIG. 7, heater electrode pads 20a, 20b, recording electrode pads 40a, 40b, and reproducing electrode pads 41a, 41b are attached onto overcoat layer 18 of each thin-film magnetic head 1. Although heater electrode pads 20a, 20b are shown outside recording electrode pads 40a, 40b and reproducing electrode pads 41a, 41b, this order is not restrictive. For example, one of heater electrode pads 20a, 20b may be provided outside recording electrode pads 40a, 40b and reproducing electrode pads 41a, 41b. Also, heater electrode pads 20a, 20b may be provided inside recording electrode pads 40a, 40b and reproducing electrode pads 41a, 41b. Further, the positions of recording electrode pads 40a, 40b may be exchanged with those of reproducing electrode pads 41a, 41b.

Heater electrode pads 20a, 20b of adjacent thin-film magnetic heads 1 are electrically connected to each other by a wire 45, for example. Therefore, all the thin-film magnetic heads 1 in bar 3 are electrically connected to each other, thereby energizing heaters 17 of all the thin-film magnetic heads 1 in bar 3 when external power supply 31 shown in FIG. 6 is turned ON.

Figure 8:
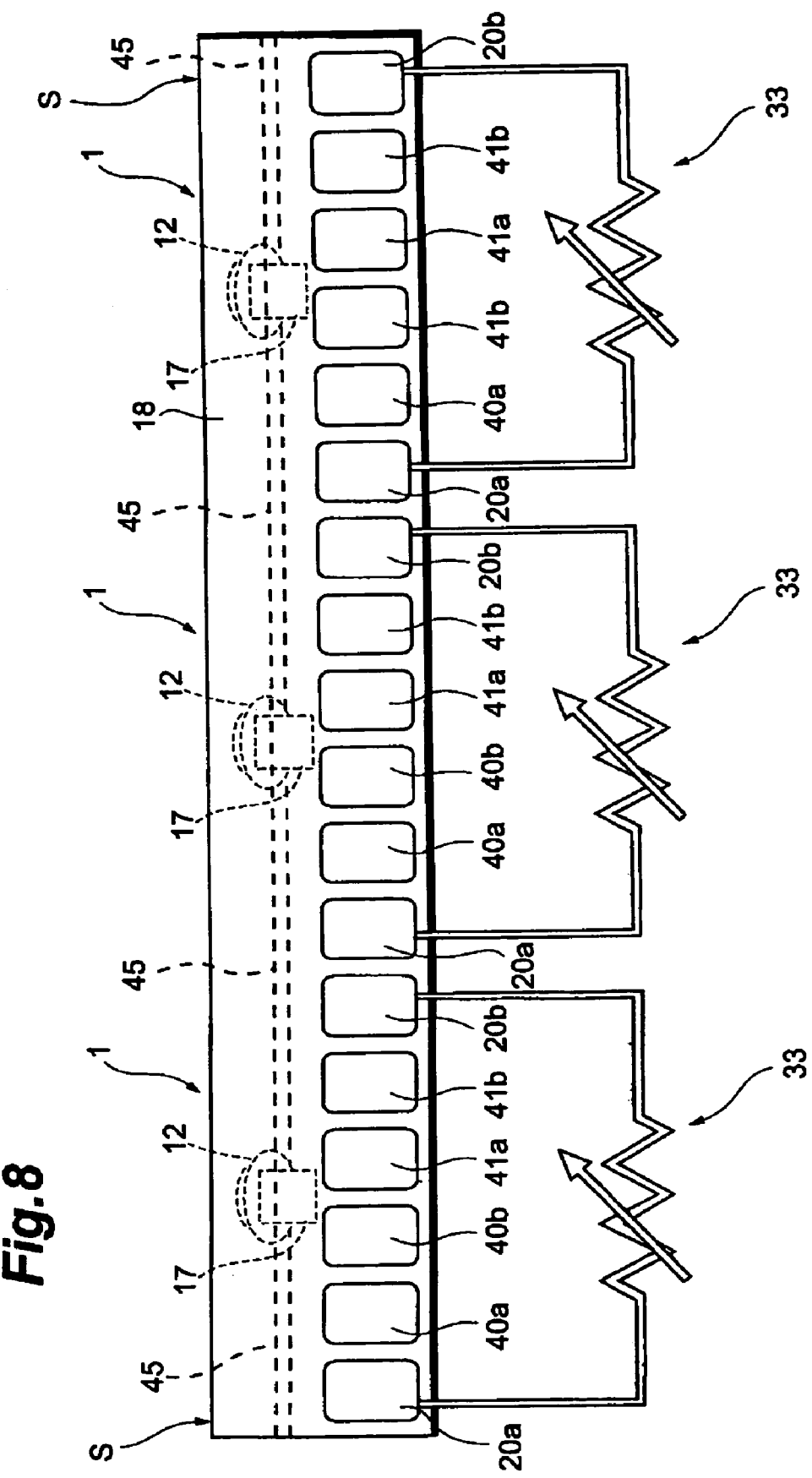
FIG. 8 is a view showing an example of heater energizing mode.

The method of energizing heater 17 is not restricted to the mode shown in FIG. 7. For example, adjacent heaters 17 may be connected to each other directly through a wire 45 disposed within bar 3 as shown in FIG. 8.

Figure 9A:
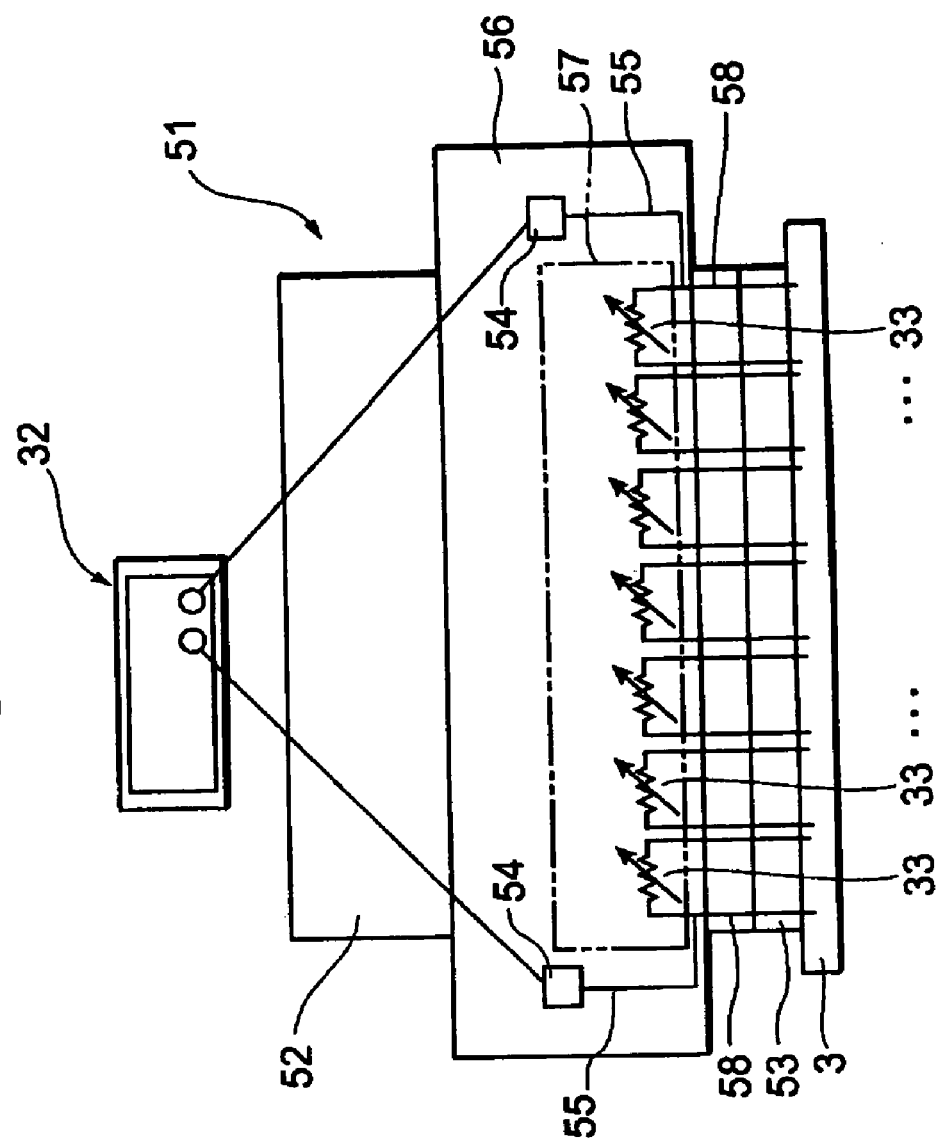
FIG. 9A is a view showing a magnetic head bar holding unit of the embodiment according to the present invention.
Figure 9B:
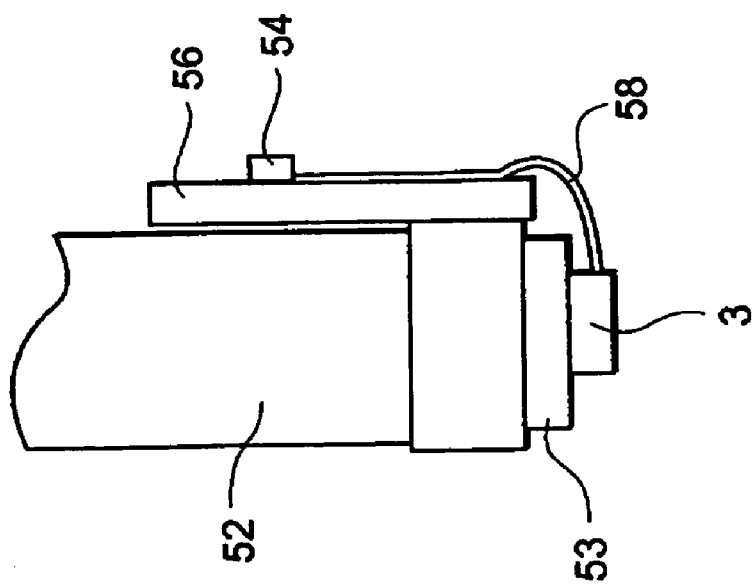
FIG. 9B is a side view of FIG. 9A.

FIG. 9A is a view showing a magnetic head bar holding unit (hereinafter, referred to "bar holding unit") of the embodiment, and FIG. 9B is a side view. The lapping device to be used in the lapping method of this embodiment is constituted by the bar holding unit and a polishing unit (explained later).

As shown in FIGS. 9A and 9B, bar holding unit 51 is provided with a lapping jig 52 and a holding rubber portion (bar holding portion) 53 positioned on the bottom portion of lapping jig 52 for holding bar 3. Lapping jig 52 is provided with a pair of electrodes 54 for energizing bar 3 and PCB (Printed Circuit Board) 56 including a pair of wires 55. Resistance controller 57 on PCB 56 is able to vary the resistance of each variable resistor 33 (shown in FIG. 8) that are connected to each of the heaters 17 in parallel through wires 58 depending on the amount that medium-opposing surface S of each thin-film magnetic head 1 is to project.

A plurality of wires 58 is provided for connecting variable resistors 33 and heaters 17. One end of the wires 55 is connected to the external most wires 58, and the other end of the wires 55 is connected to electrode 54 that is electrically connected to the external power supply 32. Thereby, electric power is supplied to heaters 17 and variable resistors 33 through wires 55 and 58.

To simplify the drawing, only seven variable resistors 33 are shown in FIG. 9A. However, because the number of variable resistors 33 in resistance controller 57 is the same as the number of heaters 17 in bar 3, there are more variable resistors 33 that are actually shown.

FIG. 10 shows a lapping device according to the present embodiment. Lapping device 65 is constituted by bar holding unit 51 and polishing unit 61. In this lapping device 65, bar 3 held by bar holding unit 51 descends and comes in contact with rotary polishing surface R in polishing unit 61, and is polished.

Next, the lapping step using the lapping device shown in FIG. 10 will be explained with reference to FIG. 11.

Figure 11A:
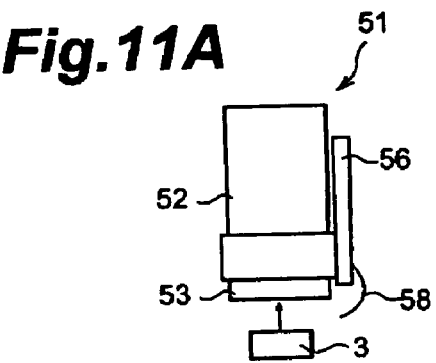
FIG. 11A to 11F are views showing lapping steps using the lapping device shown in FIG. 10.
Figure 11B:
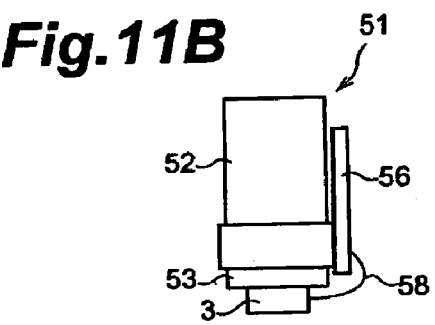
Figure 11C:
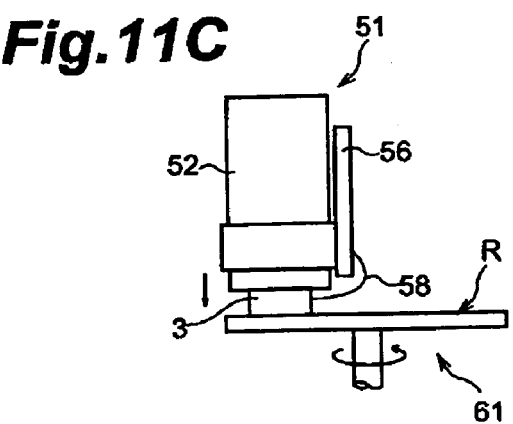

Bar 3 is initially attached to holding rubber portion 53 of bar holding unit 51 (see FIG. 11A). Subsequently, wires 58 are connected by wire bonding with heater electrode pads 20a, 20b of bar 3 attached to holding rubber portion 53 (see FIG. 11B). Then, bar holding unit 51 is moved down with bar 3, so that bar 3 comes into contact with rotary polishing surface R and is roughly polished (see FIG. 11C).

Figure 11D:
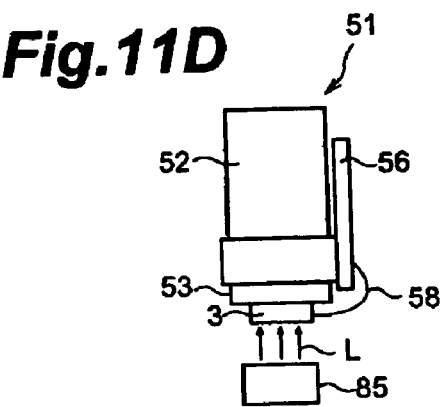

After rough polishing, bar 3 is separated from polishing unit 61 once, and medium-opposing surface S of each thin-film magnetic heads 1 in bar 3 is observed by a observation device 85 as shown in FIG. 11D. This observation is performed by an optical method or a laser method. FIG. 11D shows a situation where medium-opposing surfaces S are being observed while bar 3 is irradiated with laser. An atomic force microscope (AFM), the optical interferometer and so on are used as observation device 85.

FIG. 12A shows the observation of the medium-opposing surface in bar 3, and FIG. 12B shows each of the heater being energized while the resistance of each variable resistors 33 is varied based on the result of the observation in FIG. 12A. In this embodiment, observation device 85 observes the concavity and convexity of medium-opposing surface S of bar 3, and, based on the result, the amount that medium-opposing surface S is to project for flattening surface S is calculated. Subsequently, the resistance of each of the variable resistors 33 is determined and then is varied by resistance controller 57.

When the resistance of variable resistors 33 is increased, the current that flows in heater 17 connected to variable resistor 33 increases, so as to increase the amount of heat released by heater 17. Therefore, the projection of medium-opposing surface S increases. On the contrary, when the resistance of variable resistors 33 is decreased, the phenomenon is reversed and the amount of the projection of medium-opposing surface S decreases.

After varying the resistance of variable resistors 33 by resistance controller 57, when heaters 17 are energized by external power supply 32, the volume of medium-opposing surfaces S of each thin-film magnetic head 1 expands according to the resistance of variable resistors 33, flattening medium-opposing surfaces S in bar 3.

In FIG. 12A, resistance controller 57 and observation device 85 are separately units, and resistance of variable resistors 33 in resistance controller 57 is varied by the operator manually or the like based on the result obtained from observation device 85. However, resistance controller 57 and observation device 85 may work in conjunction with each other. That is, observation device 85 can send the data from the observation to resistance controller 57, and resistance controller 57 can vary the resistance of variable resistors 33 automatically based on the data.

Figure 11E:
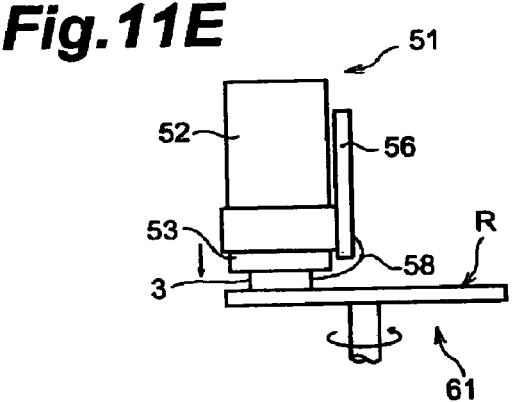

The next step will be explained with reference to FIG. 11E. When medium-opposing surfaces S in bar 3 are flatten while heaters 17 and variable resistors 33 in thin-film magnetic heads 1 in bar 3 are energized, as shown in FIG. 12B, bar 3 is moved down so as to come into contact with rotary polishing surface R, thereby polishing medium-opposing surface S. Subsequently, polishing removes overcoat layer 18 from corner T to the region indicated by broken line L as shown in FIG. 5.

Figure 11F:
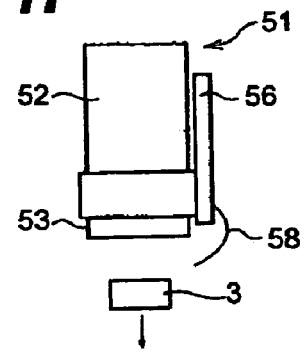

After lapping, as shown in FIG. 11F, bar 3 is detached from holding rubber portion 53 of bar holding unit 51.

Figure 13:
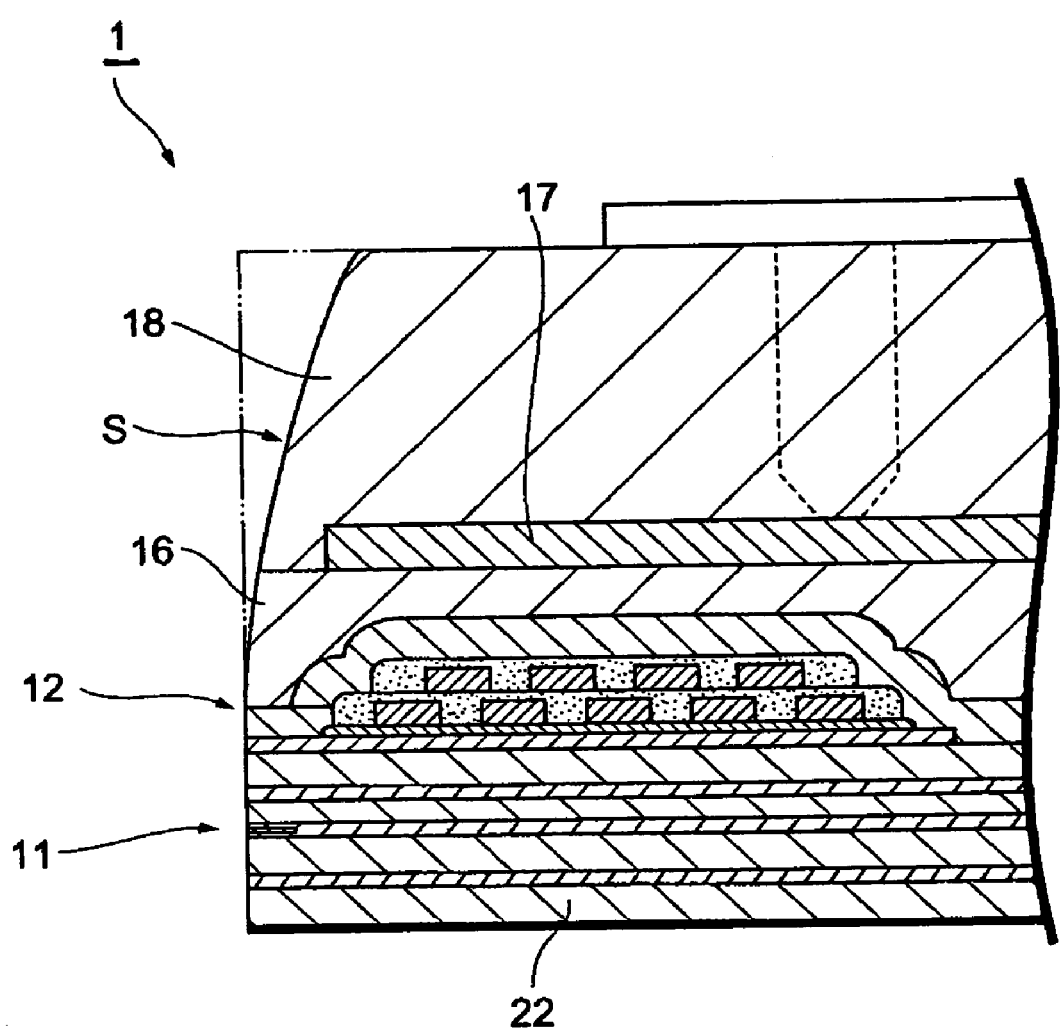
FIG. 13 is a schematic sectional view taken in a direction perpendicular to the medium-opposing surface of the thin-film magnetic head after the lapping of the embodiment according to the present invention.

FIG. 13 is a schematic sectional view of thin-film magnetic head 1 taken in a direction perpendicular to medium-opposing surface S after lapping. The dash-double-dot line indicates the part shaved off by the lapping. FIG. 13 shows only an example of form after lapping. In some cases, a region extending from corner T of overcoat layer 18 (see FIG. 5) to recording head part 12 or reproducing head part 11 may be polished.

If medium-opposing surface S is not flattened when thin-film magnetic head 1 in bar 3 is lapped, not all the area in bar 3 comes into contact with rotary polishing surface R, thereby yielding polishing variations in thin-film magnetic heads 1. On the other hand, when thin-film magnetic head 1 is polished with medium-opposing surface S flattened as in the present embodiment, medium-opposing surfaces S in bar 3 come into contact with rotary polishing surface R uniformly, and medium-opposing surfaces S of all the thin-film magnetic heads 1 can be polished so as to form the shape shown in FIG. 13.

As stated above, according to the lapping method using the lapping device of the present embodiment, it is possible to vary the resistance of variable resistor 33 for each heater 17 so as to adjust the amount of current that flows to each heater 17, thereby making it possible to adjust the amount that medium-opposing surface S of each thin-film magnetic head 1 projects. Therefore, medium-opposing surface S of each thin-film magnetic head 1 can be lapped effectively. As a result, even if medium-opposing surface S expands when recording head part 12 is energized, the flying height of thin-film magnetic head 1 can be set to an appropriate value. Thereby, thin-film magnetic head 1 and recording surface D of the hard disk can be prevented from coming in contact with each other, and the amount of levitation needed for the thin-film magnetic heads can be reduced.

During the lapping operation, all heaters 17 are energized by the same power supply, so as to lap a plurality of medium-opposing surfaces S of thin-film magnetic heads 1 together. Therefore, not so much equipment is needed for lapping a plurality of medium-opposing surfaces S of the thin-film magnetic heads, and medium-opposing surface S can be lapped effectively and efficiently.

Heater 17 is not limited to the position of shown in FIG. 5. Heater 17 may be located behind recording head part 12 as seen from medium-opposing surface S, for example. Preferably, reproducing head part 11, recording head part 12, and heater 17 are laminated in this order on support 2 side, as shown in FIG. 5. Namely, heater 17 is preferably positioned closer to recording head part 12 than reproducing head part 11. When thin-film coil 15 is energized at the time of recording onto the hard disk, the surroundings of recording head part 12 are expanded by the heat generated, thereby the vicinity of recording head part 12 comes the closest to the hard disk. Therefore, polishing the part with the most expansion while heater 17 is energized can prevent thin-film magnetic head 1 and recording surface D of the hard disk from coming in contact with each other. When heater 17 is disposed within overcoat layer 18 as shown in FIG. 5, heater 17 may be located at any position within overcoat layer 18 regardless of the distance from medium-opposing surface S or recording head part 12.

A single heater 17 may be disposed at the above-mentioned position, or a plurality of heaters 17 may be arranged in separate positions. FIG. 14 is a schematic sectional view showing an example of thin-film magnetic head 1 with two heaters arranged in separate locations. In this drawing, heaters 60 are located at separate locations at the same height as heater 17 was disposed within overcoat layer 18 shown in FIG. 3.

Though heater 17 is disposed within overcoat layer 18 of thin-film magnetic head 1 in this embodiment, heater 17 may be bonded by an adhesive or the like onto the surface of overcoat layer 18 on the side opposite from support 2 as shown in FIG. 15, thereby making it unnecessary to form heater 17 within thin-film magnetic head 1, thus facilitating the manufacture of thin-film magnetic head 1. FIG. 16 shows the application of the lapping device according to the present embodiment to bar 3 shown in FIG. 15. Heater 17 is formed by film heaters such as an FPC (Flexible Printed Circuit) and so on, and has a thickness of about 50 μm to about 100 μm.

Employing a configuration in which heater 17 is bonded onto the surface of overcoat layer 18 on the side opposite from support 2 can yield an effect similar to that obtained when heater 17 is disposed within overcoat layer 18 of thin-film magnetic head 1. Namely, as shown in FIG. 13, medium-opposing surface S can be expanded in the vicinity of heater 17 when heater 17 is energized and generates heat.

Though heater 17 is used for expanding medium-opposing surface S at the time of lapping in the present embodiment described above, heater 17 may be used in another way. That is, upon energization, heater 17 may be used to generate heat at the time of recording/reproducing with respect to a hard disk, so as to expand medium-opposing surface S in the vicinity of reproducing head part 11, thereby adjusting the gap between reproducing head part 11 and the hard disk. Here, heat generated from heater 17 may expand areas of thin-film magnetic head 1 that do not need to be expanded. However, also in such cases, these areas can be eliminated in advance by applying the lapping method of the present embodiment.

Though the present invention is specifically explained with reference to the embodiment in the foregoing, the present invention is not limited to the above-mentioned embodiments. For example, though the thin-film magnetic heads employ the longitudinal recording scheme (in-plane recording type) in the above-mentioned embodiments, the present invention is also applicable to thin-film magnetic heads of perpendicular recording type.

As described above, the present invention provides a magnetic head bar holding unit, a lapping device, and a method of lapping a medium-opposing surface of a thin-film magnetic head that can prevent a thin-film magnetic head and a hard disk from contacting each other and thereby achieve lower levitation in the thin-film magnetic head.

The basic Japanese Application No. 2003-114713 filed on Apr. 18, 2003 is hereby incorporated by reference.

What is claimed is:

1. A method of lapping a medium-opposing surface of a thin-film magnetic head, the method comprising the steps of:
   preparing a magnetic head bar in which thin-film magnetic heads are arranged in a row, each of the thin-film magnetic heads including a magnetoresistive device for reproducing, an inductive electromagnetic transducer for recording, a heater for generating heat when energized, the heaters in the respective thin-film magnetic heads being electrically connected to their neighbors in series;
   connecting a variable resistor to each of the heaters in parallel;
   varying resistance of each of the variable resistors depending on an amount that the medium-opposing surface of the thin-film magnetic head is to project;
   polishing the medium-opposing surface of the thin-film magnetic head in the magnetic head bar while energizing the heaters.

2. A method of lapping a medium-opposing surface of a thin-film magnetic head according to claim 1, wherein the thin-film magnetic head is formed on a support and the heater is disposed on a surface of the thin-film magnetic head opposite from the support.

3. A magnetic head bar holding unit, comprising:
   a bar holding portion for holding a magnetic head bar in which thin-film magnetic heads are arranged in a row, each of the thin-film magnetic heads including a heater for generating heat when energized; and
   variable resistors to be connected to each of the heaters in parallel.

4. A lapping device, comprising:
   a magnetic head bar holding unit having a bar holding portion for holding a magnetic head bar in which thin-film magnetic heads are arranged in a row, each of the thin-film magnetic heads including a heater for generating heat when energized, and variable resistors to be connected to each of the heaters in parallel,
   a polishing unit for polishing a medium-opposing surface of the magnetic head bar held by the bar holding unit.

* * * * *